(12) United States Patent
Falk

(10) Patent No.: US 10,186,872 B2
(45) Date of Patent: Jan. 22, 2019

(54) METHOD FOR CONNECTING AN ENERGY GENERATION INSTALLATION TO A MEDIUM VOLTAGE NETWORK AND ENERGY GENERATION INSTALLATION

(71) Applicant: SMA Solar Technology AG, Niestetal (DE)

(72) Inventor: Andreas Falk, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 25 days.

(21) Appl. No.: 15/715,573

(22) Filed: Sep. 26, 2017

(65) Prior Publication Data

US 2018/0026448 A1 Jan. 25, 2018

Related U.S. Application Data

(63) Continuation of application No. PCT/EP2016/054219, filed on Feb. 29, 2016.

(30) Foreign Application Priority Data

Mar. 27, 2015 (DE) .......................... 10 2015 104 783

(51) Int. Cl.
*H02J 1/00* (2006.01)
*H02M 7/54* (2006.01)
*G05F 1/10* (2006.01)
*H02J 3/38* (2006.01)

(52) U.S. Cl.
CPC ............... *H02J 3/383* (2013.01); *H02M 7/54* (2013.01); *G05F 1/10* (2013.01); *Y02E 10/563* (2013.01)

(58) Field of Classification Search
CPC .. H02J 3/383; H02M 7/54; G05F 1/10; Y02E 10/563
USPC ............................................................. 307/7
See application file for complete search history.

(56) References Cited

U.S. PATENT DOCUMENTS

2015/0115722 A1 4/2015 Fawzy et al.

OTHER PUBLICATIONS

International Search Report dated May 3, 2016 for International Application PCT/EP2016/054219.

*Primary Examiner* — Hal Kaplan
(74) *Attorney, Agent, or Firm* — Eschweiler & Potashnik, LLC

(57) ABSTRACT

A method for connecting an energy generation installation to a medium-voltage grid includes determining a calibration factor for adjusting first voltage values to second voltage values by a controller of the energy generation installation. During an idle state of a medium-voltage transformer, the first voltage values are detected at a capacitive voltage divider, arranged on the medium-voltage side of the medium-voltage transformer, and the second voltage values are detected by a voltage detection means, arranged on the low-voltage side of the medium-voltage transformer. The method further includes closing a circuit breaker arranged on the medium-voltage side of the medium-voltage transformer by the controller of the energy generation installation, when voltage values determined at the capacitive voltage divider exceed a first threshold value after the calibration factor has been applied.

7 Claims, 1 Drawing Sheet

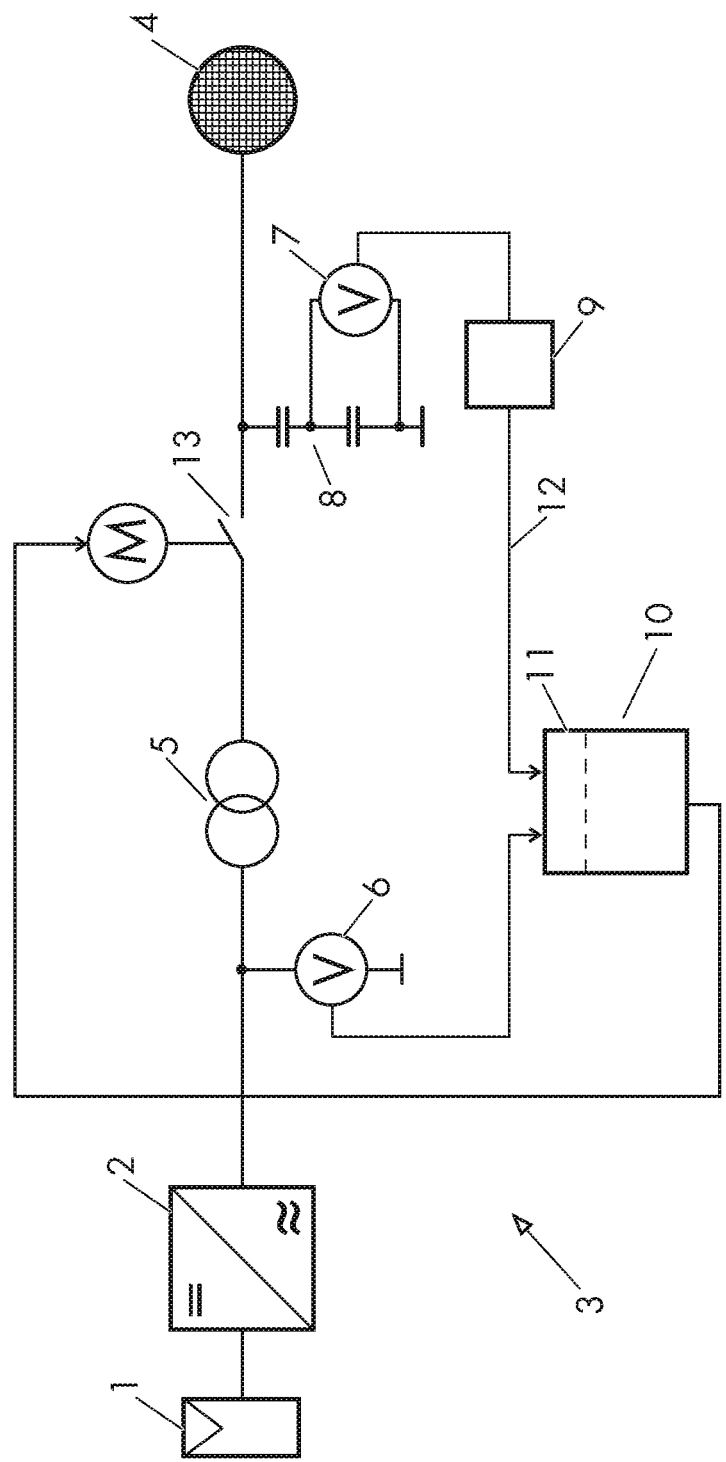

METHOD FOR CONNECTING AN ENERGY GENERATION INSTALLATION TO A MEDIUM VOLTAGE NETWORK AND ENERGY GENERATION INSTALLATION

CROSS-REFERENCE TO RELATED APPLICATIONS

This application claims priority to PCT Patent Application Number PCT/EP2016/054219, filed on Feb. 29, 2016, which claims priority to German Patent Application Number DE 10 2015 104 783.7, filed on Mar. 27, 2015, which are hereby incorporated by reference in their entirety.

FIELD

The disclosure relates to a method for connecting an energy generation installation to a medium-voltage grid, in which recourse is made to at least two voltage values from different voltage detection means, and to a corresponding energy generation installation, which comprises at least two different voltage detection means for grid and installation protection.

BACKGROUND

The prior art discloses methods in which a plurality of switches that are connected in series have to be closed in order to connect a photovoltaic installation to a medium-voltage grid. This results, for example, from different regulations or responsibilities relating to switches on the low-voltage side in comparison with those on the medium-voltage side. Generally, the switches on the medium-voltage side cannot be operated by a controller of the photovoltaic installation; it is often a case of switchgear systems that can only be switched manually. The switchgear systems remain closed in normal operation and are only opened in the event of faults and for maintenance work. In many cases, maintenance personnel are not authorized to switch the medium-voltage switchgear system.

If there is at least one switch present both on the medium-voltage side and on the low-voltage side, the switch on the medium-voltage side can thus remain closed and the switch on the low-voltage side then serves the purpose of connecting the photovoltaic installation to the medium-voltage grid. The switch on the low-voltage side can be actuated by the controller of the photovoltaic installation; the switches are generally expensive, motor-driven switches because large currents flow through them. In this case, voltage detection means are usually provided on both sides of the switch because, even in the case of an open switch, for example, the voltage level of the grid voltage has to be identified in order to establish whether it is possible to connect to the grid.

In particular, connection is permitted only in the presence of the normatively predefined grid connection conditions and synchronization conditions (amplitude identity and in-phase nature of the grid and voltage to be fed).

Connection standards also specify the accuracy with which a check, for example of the grid voltage, has to be carried out. For reasons of safety, a further voltage detection means is usually provided on the medium-voltage side; here it is often a voltage detection means having a capacitive voltage divider. Such a voltage detection means having a capacitive voltage divider is usually subjected to lower requirements in terms of accuracy, but for reasons of safety should at least indicate whether, for example, 50% of the grid voltage is applied.

Disadvantages of this design are the multiplicity of voltage detection means, the Joule heat losses in the low-voltage switch and the costs of the switch on the low-voltage side.

DE 10 2013 202 868 A1 has already disclosed a voltage measuring arrangement having a reference voltage measuring apparatus that is designed with a higher degree of measurement accuracy than a capacitive voltage measuring apparatus. The measurement location of the reference voltage measuring apparatus is located in another field or on the busbar but at any rate is electrically connected to the measurement location at which the capacitive voltage measurement is performed.

DE 10 2012 105 721 A1 from the same applicant discloses a method for controlling a plurality of inverters that are connected on the input side in each case to a current source and on the output side to a common grid transfer point, in which electrical variables at the grid transfer point are measured and simultaneously correlated with the electrical variables measured at the individual inverters.

DD 2 05 257 A1 describes a high-voltage measuring device having a capacitive voltage divider, wherein the voltage values are subsequently amplified for analog data transmission by means of an amplifier circuit.

In order to dispense with the expensive, motor-driven switch on the low-voltage side, it is known to provide a motor-driven medium-voltage power switch and to use it to connect the photovoltaic installation to the medium-voltage grid. Since lower currents are required on the medium-voltage side on account of the higher voltage level given the same power, the motor-driven medium-voltage power switch offers advantages in terms of cost. In this case, the voltage detection means on the medium-voltage side has to satisfy higher demands in terms of accuracy. The grid connection standards have to be able to be checked with sufficient accuracy before the photovoltaic installation is connected, that is to say when the medium-voltage power switch is open. Voltage detection means that contain an isolating transformer are used for this purpose. The voltage detection means decrease the medium voltage to such an extent that it can be measured with a high degree of accuracy by means of established methods. However, such voltage detection means having isolating transformers are large and expensive on account of the high isolating voltage.

SUMMARY

The disclosure is directed to a method for connecting an energy generation installation to a medium-voltage grid that overcomes the disadvantages mentioned. Furthermore, the disclosure specifies an energy generation installation that manages with a small number of cost-effective switches and voltage detection means and nevertheless meets all specifications in terms of grid and installation protection.

A method according to the disclosure for connecting an energy generation installation to a medium-voltage grid comprises determining a calibration factor using a controller of the energy generation installation during an idle state of a medium-voltage transformer. The method also comprises adjusting first voltage values to second voltage values. Here, during the idle state of the medium-voltage transformer, the first voltage values are detected at a capacitive voltage divider, arranged on the medium-voltage side of the medium-voltage transformer. The second voltage values are detected by a voltage detection means, arranged on the low-voltage side of the medium-voltage transformer. The controller of the energy generation installation closes a circuit breaker in order to connect an energy generation installation to a medium-voltage grid when voltage values determined at the capacitive voltage divider exceed a first threshold value after the calibration factor has been applied. The circuit breaker is arranged here on the medium-voltage side of the medium-voltage transformer.

The voltage detection means, arranged on the low-voltage side of the medium-voltage transformer, in one embodiment is a three-phase measurement that determines the voltages with a tolerance of less than 1% deviation. The measurement is necessary in order to provide voltage values for the controller of the energy generation installation, the voltage values allowing the grid connection conditions (grid and installation protection) to be assessed before an energy generation installation is connected to a medium-voltage grid, in particular the voltage to be fed has to be within a predefined range of values.

It may then be necessary to synchronize the AC voltage provided by the energy generation installation to the corresponding values of the medium-voltage grid. In the case of a synchronous connection of this kind, no compensation currents or only very small compensation currents flow, with the result that the operating means and the grid are only slightly loaded or not loaded at all. The measurement values of the voltage detection means, arranged on the low-voltage side, must be highly accurate in order that it can be ensured that grid-compliant energy is fed to the medium-voltage grid.

The first voltage values, which are detected at the capacitive voltage divider, arranged on the medium-voltage side of the medium-voltage transformer, are associated with higher measurement tolerances. In the case of a three-phase grid, this also generally concerns a three-phase measurement, that is to say that one capacitive voltage divider is present for each phase of the grid.

In accordance with the disclosure, the first voltage values are calibrated by means of the second voltage values, as a result of which the first voltage values have a higher accuracy and can be used as reference values for connecting an energy generation installation to a medium-voltage grid. The controller of the energy generation installation can compare the calibrated first voltage values with the second voltage values before the energy generation installation is connected to the medium-voltage grid. Starting from a minimum voltage in the medium-voltage grid, the controller can connect the energy generation installation to the medium-voltage grid by means of a, preferably motor-driven, circuit breaker. The first voltage values are calibrated by means of the second voltage values during an idle state of the medium-voltage transformer. No energy flows between the energy generation installation and the grid in the idle state of the medium-voltage transformer. In this case, the voltage drop across the leakage inductances of the transformer is practically zero and the voltages on both sides of the transformer correspond in terms of phase and amplitude (adjusted in accordance with the turns ratio).

Since the controller of the energy generation installation controls the feed-in of energy, the controller can also determine the idle state of the medium-voltage transformer and therefore determine the point in time of the calibration of the first voltage values.

In one embodiment of the method according to the disclosure, the first voltage values are amplified by means of an amplifier, in order to enable transmission of the first voltage values in a manner that is not sensitive to interference.

In a further embodiment of the method according to the disclosure, the amplified first voltage values are transmitted to the controller of the energy generation installation by means of an analog data transmission means.

A photovoltaic installation according to the disclosure comprises a photovoltaic inverter that is connected on the input side to a photovoltaic generator, wherein the output of the photovoltaic inverter is connected without a switch inbetween to a low-voltage side of a medium-voltage transformer. The photovoltaic installation further comprises a capacitive voltage divider, arranged on a medium-voltage side of the medium-voltage transformer, for detecting first voltage values, and a voltage detection means, arranged on the low-voltage side of the medium-voltage transformer, for detecting second voltage values. The installation further comprises a circuit breaker, arranged on the medium-voltage side of the medium-voltage transformer, the circuit breaker being suitable for connecting the output of the PV inverter to a medium-voltage grid. The photovoltaic installation further comprises a calibration unit for adjusting the first voltage values to the second voltage values during an idle state of the medium-voltage transformer and a controller for actuating the circuit breaker when voltage values identified at the capacitive voltage divider and adjusted by means of the calibration unit exceed a first threshold value.

In an advantageous embodiment, the photovoltaic installation according to the disclosure comprises an amplifier for amplifying the first voltage values.

In general, there are large geographical distances between the medium-voltage switching station, in which the circuit breaker and the capacitive voltage divider may be arranged, and the controller of the photovoltaic installation, with the result that amplification may be necessary to transmit the first voltage values in a manner that is not sensitive to interferences.

In a further advantageous embodiment, the photovoltaic installation according to the disclosure comprises an analog data transmission means for transmitting the amplified first voltage values to the controller of the photovoltaic installation.

In a further advantageous embodiment, the controller of the photovoltaic installation according to the disclosure also comprises the calibration unit. The controller and the calibration unit may also be integrated in the photovoltaic inverter.

BRIEF DESCRIPTION OF THE DRAWINGS

The disclosure is described in more detail below with reference to an exemplary embodiment with the aid of a FIGURE.

FIG. 1 shows a schematic illustration of a photovoltaic installation according to the disclosure.

DETAILED DESCRIPTION

The disclosure relates to a method for connecting an energy generation installation to a medium-voltage grid, in which recourse is made to at least two voltage values from different voltage detection means, and to a corresponding energy generation installation, which comprises at least two different voltage detection means for grid and installation protection. The voltage detection means detect AC voltages. The energy generation installation can preferably be an installation that is supplied with power from regenerative sources; it can particularly preferably be a photovoltaic installation. The current trend is for increasingly large photovoltaic installations, which then generally feed directly into a medium-voltage grid. A medium-voltage transformer is then usually connected between the photovoltaic installation and the medium-voltage grid because the photovoltaic installation itself is operated at a low-voltage level.

FIG. 1 shows, as an exemplary embodiment, a photovoltaic generator 1 connected to a DC input of a photovoltaic inverter 2. In a real implementation, the photovoltaic generator 1 may include a multiplicity of individual modules connected in series and in parallel; another source of DC voltage, a battery or similar may also be connected to the DC input of a photovoltaic inverter 2, in addition to or instead of the photovoltaic generator 1. The photovoltaic inverter 2 converts the DC power of the photovoltaic generator 1 to an AC power at its AC output, the AC power being able to be fed into a medium-voltage grid 4. In general, the grid is a three-phase grid. In one embodiment the AC output of the photovoltaic inverter 2 is connected directly to the low-voltage side of a medium-voltage transformer 5 without further switching elements being interposed. A circuit breaker 13 is arranged on the medium-voltage side between the medium-voltage transformer 5 and the medium-voltage grid 4. This may be a power switch, which is also able to isolate short-circuit currents, or a load break switch, which can only carry normal load currents. In one embodiment, due to the absence of a circuit breaker on the low-voltage side, the entire energy generation installation can only be isolated from the grid by the circuit breaker 13. In one embodiment the circuit breaker may also have two component switches that are arranged in series and are operated independently.

In order to regulate the voltage generated by the photovoltaic installation 3 and to adjust the voltage with the voltage in the medium-voltage grid 4, the photovoltaic installation 3 comprises a voltage detection means 6 that is arranged on the low-voltage side and that can measure the voltage conditions at the AC output of the photovoltaic inverter 2 with a high degree of accuracy. The values measured by the voltage detection means 6 are transmitted to the controller 10 in a digital or analog manner, the controller regulating the photovoltaic inverter 2.

However, before the photovoltaic installation 3 is connected to the grid, that is to say when the circuit breaker 13 is open, it is not possible to measure the voltage conditions in the medium-voltage grid 4 at the voltage detection means 6. A capacitive voltage divider 8 that is often present on the medium-voltage side generally serves to provide information for maintenance personnel and is generally present for all phases of the grid and frequently has the sole purpose of indicating to the operating personnel of the medium-voltage switchgear system whether voltage is present in the installation, consisting only of an optical display with a small LCD display screen. This way of measuring the voltage by means of a capacitive voltage divider 8 is inexpensive but is associated with a large error tolerance. In order to obtain then a reliable statement about the voltage characteristics in the medium-voltage grid 4 before the photovoltaic installation 3 is connected to the medium-voltage grid 4, in accordance with the disclosure, first voltage values are determined using a voltage detection means 7 (e.g., a voltage detection circuit, a voltage sensor, or a voltage meter) at the capacitive voltage divider 8 and are calibrated with the aid of second voltage values that are detected by the voltage detection means 6. To that end, the values that are detected by the voltage detection means 7 are transmitted to the controller 10, for example as analog voltage values. The controller 10 for this purpose regulates the operation of the photovoltaic inverter 2 in a way that when the circuit breaker 13 is closed the amplitude and phase of the voltage generated by the photovoltaic inverter 2 corresponds to the amplitude and phase of the medium-voltage grid 4 and therefore no power flows to the medium-voltage grid 4. As an alternative, in the case of a current-regulated inverter, the current fed to the grid may be regulated to zero. This is also referred to as idle operation of the photovoltaic inverter 2 and the medium-voltage transformer 5. Since no current flows, there is no voltage drop across the windings of the medium-voltage transformer 5 and the same voltage is present on both sides of the medium-voltage transformer 5 (taking into account the turns ratio of the medium-voltage transformer). It is therefore possible to calibrate the two voltage measurements in this configuration. In this configuration, if the controller 10 receives, for example, a measurement value of 20 V from the capacitive voltage divider 8 and a voltage value of 500 V is measured at the voltage detection means 6 and the turns ratio of the medium-voltage transformer 5 is 1:40, a calibration factor of $(500/20) \times 40 = 1000$ is thus identified. A value of 20 V detected by the capacitive voltage divider 8 then corresponds to a voltage amplitude in the medium-voltage grid of 20,000 V.

The calibration can also be performed by a separate calibration unit 11, which may also be embodied as part of the controller 10, however, In general, there are relatively large distances between the location of the voltage detection means 7, for example, the medium-voltage switching station, and the photovoltaic inverter 2. In order to ensure transmission of the measurement values of the capacitive voltage divider 8 in a manner insensitive to interference signals, it is often necessary to amplify the measurement signal that is obtained at one capacitor of the capacitive voltage divider 8 by the voltage detection means 7. The amplifier 9 may be an operational amplifier, which amplifies the voltage signal at the capacitor without overloading said capacitor. The operational amplifier may therefore advantageously be embodied as an impedance converter. For this purpose, the operational amplifier circuit has to be supplied with an independent supply voltage, for example with 24 V from the photovoltaic inverter 2. The amplified voltage values are transmitted to the controller 10 via an analog data transmission circuit 12, as illustrated in FIG. 1.

Before initial activation of the installation, that is to say when a calibration factor for the photovoltaic installation 3 has not yet been identified, the process may be as follows:

The circuit breaker 13 is closed if it is possible to identify that the medium-voltage grid 4 is not impaired; this may be carried out by the operating personnel manually, for example. The photovoltaic inverter 2 sets a voltage at the AC output thereof that corresponds to the nominal operating voltage of the medium-voltage grid 4 after transformation by the medium-voltage transformer 5. Directly after connection, the voltage and frequency values measured by the voltage detection means 6 can be compared with the permissible ranges that are specified in the grid connection conditions. If the values do not meet the normative specifications, the circuit breaker 13 is opened again. After the connection, calibration is carried out as described above.

The invention claimed is:

1. A method for connecting an energy generation installation to a medium-voltage grid, comprising:
    determining a calibration factor for adjusting first voltage values to second voltage values by a controller of the energy generation installation, wherein, during an idle state of a medium-voltage transformer, the first voltage values are detected at a capacitive voltage divider, arranged on the medium-voltage side of the medium-voltage transformer, and the second voltage values are detected by a voltage detection means, arranged on the low-voltage side of the medium-voltage transformer, and closing a circuit breaker arranged on the medium-voltage side of the medium-voltage transformer by the controller of the energy generation installation, when voltage values determined at the capacitive voltage divider exceed a first threshold value after the calibration factor has been applied.

2. The method as claimed in claim 1, wherein the first voltage values are amplified by means of an amplifier.

3. The method as claimed in claim 2, wherein the amplified first voltage values are transmitted to the controller of the energy generation installation by means of an analog data transmission circuit.

4. A photovoltaic installation, comprising:
a photovoltaic (PV) inverter connected on an input side thereof to a photovoltaic generator and its output connected without a switch in-between to a low-voltage side of a medium-voltage transformer,
a capacitive voltage divider arranged on a medium-voltage side of the medium-voltage transformer configured to detect first voltage values,
a voltage detection circuit arranged on the low-voltage side of the medium-voltage transformer for detecting second voltage values,
a circuit breaker arranged on the medium-voltage side of the medium-voltage transformer and configured to connect the output of the PV inverter to a medium-voltage grid,
a calibration unit configured to adjust the first voltage values to the second voltage values during an idle state of the medium-voltage transformer,
a controller configured to actuate the circuit breaker when voltage values detected at the capacitive voltage divider and adjusted by the calibration unit exceed a first threshold value.

5. The photovoltaic installation as claimed in claim 4, further comprising an amplifier configured to amplify the first voltage values.

6. The photovoltaic installation as claimed in claim 5, further comprising an analog data transmission circuit configured to transmit the amplified first voltage values to the controller of the photovoltaic installation.

7. The photovoltaic installation as claimed in claim 4, wherein the controller comprises the calibration unit.

* * * * *